United States Patent [19]

Eisenring et al.

[11] 4,165,936
[45] Aug. 28, 1979

[54] COAXIAL TRANSMITTING AND RECEIVING OPTICS FOR AN ELECTRO-OPTIC RANGE FINDER

[75] Inventors: Josef Eisenring, Altstätten; Klaus W. Hildebrand, Heerbrugg; Jakob Tanner, Balgach, all of Switzerland

[73] Assignee: Wild Heerbrugg Aktiengesellschaft, Heerbrugg, Switzerland

[21] Appl. No.: 856,048

[22] Filed: Nov. 30, 1977

[30] Foreign Application Priority Data

Dec. 3, 1976 [CH] Switzerland ............ 15275/76

[51] Int. Cl.$^2$ .................... G01C 3/08; G02B 27/14
[52] U.S. Cl. ............................. 356/5; 350/1.2; 350/91; 350/172
[58] Field of Search ............... 350/1.2, 10, 91, 172; 356/5, 28

[56] References Cited

U.S. PATENT DOCUMENTS

| | | | |
|---|---|---|---|
| 3,698,812 | 10/1972 | Nelson | 356/5 |
| 3,857,626 | 12/1974 | Rosenberger et al. | 350/91 |
| 3,918,793 | 11/1975 | Kraft | 350/91 |
| 3,992,629 | 11/1976 | Chapman | 350/172 |
| 4,113,381 | 9/1978 | Epstein | 356/152 |

FOREIGN PATENT DOCUMENTS

| | | | |
|---|---|---|---|
| 64321 | 10/1968 | German Democratic Rep. | 356/4 |
| 1284637 | 12/1968 | Fed. Rep. of Germany | 356/5 |
| 1623539 | 11/1971 | Fed. Rep. of Germany | 356/5 |
| 468263 | 3/1969 | Switzerland | 356/152 |

*Primary Examiner*—S. C. Buczinski
*Attorney, Agent, or Firm*—Frishauf, Holtz, Goodman & Woodward

[57] ABSTRACT

The range finder is of the type for transmitting and receiving a modulated beam of light for the distance determination to a remote reflector and has an integrated sighting telescope for sighting the reflector or some other target.

The coaxial transmitting and receiving optical system and the sighting telescope have a common optical axis.

A beam deflector which deflects into the optical axis the transmitting beam coming from an infra-red radiation-emitting source is arranged in the vicinity of the position at which there is an intermediate image formation of the transmitting beam path.

A dielectric coating system which is permeable by visible light is arranged approximately perpendicular to the common optical axis. It is on one side bounded by air and is arranged in such a way that the transmitting beam from the beam deflector strikes the coating system in an almost perpendicular manner.

5 Claims, 1 Drawing Figure

U.S. Patent  Aug. 28, 1979  4,165,936
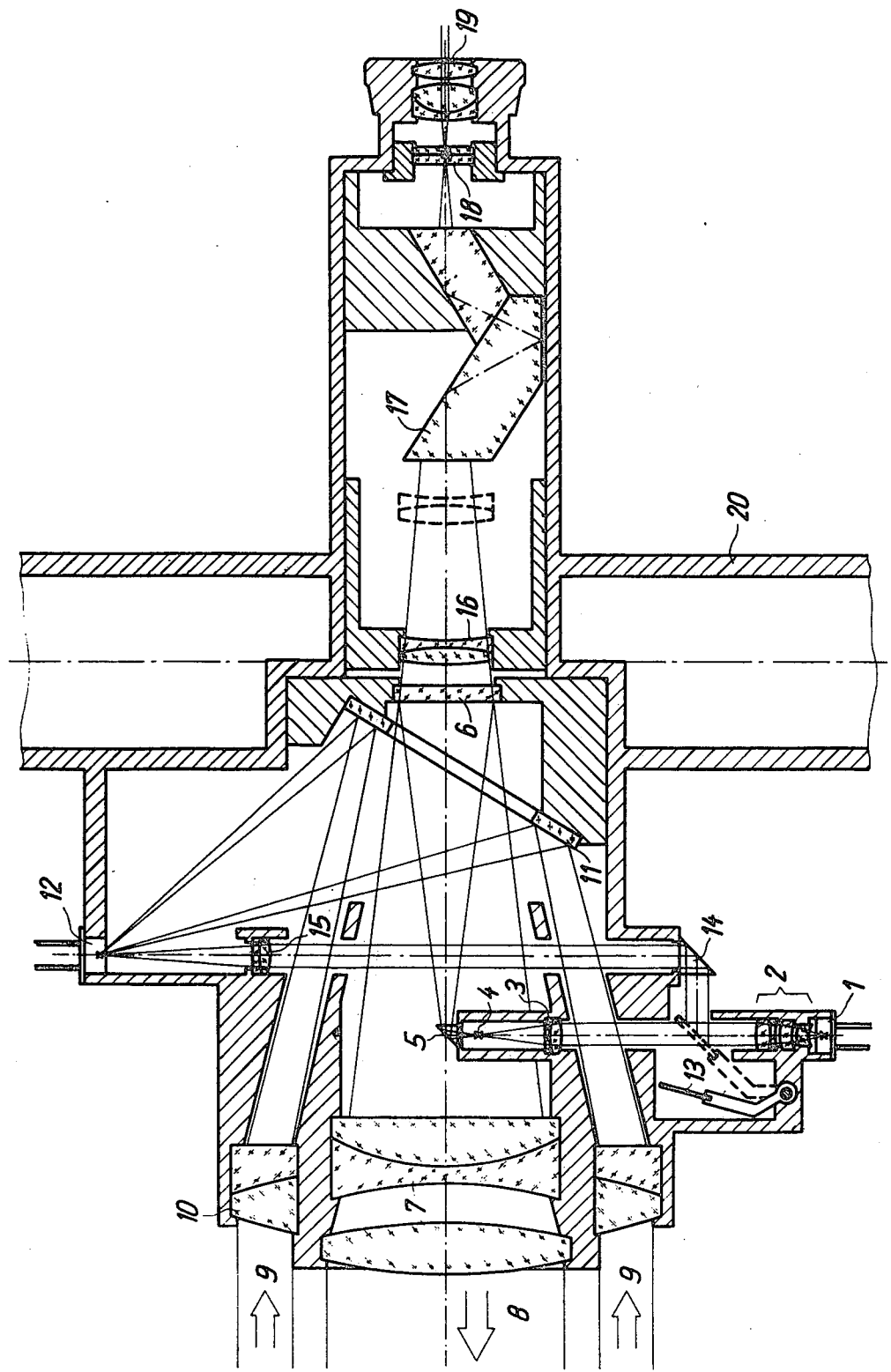

COAXIAL TRANSMITTING AND RECEIVING OPTICS FOR AN ELECTRO-OPTIC RANGE FINDER

BACKGROUND OF THE INVENTION

The invention relates to a coaxial transmitting and receiving optical system for an electro-optical range finder. The range finder is of the type which transmits to and receives from a remote reflector a modulated beam of light for determination of the distance. The system also has an integrated sighting telescope for sighting the reflector or some other target.

Special theodolites called tacheometers are known which permit the accurate measure simultaneously of directions and distances. The direction is normally measured by reading off graduated circles. The distance is measured by means of a reticule scale in the telescope and a test plate set up at the target point. For some time, electro-optical range finders have been used for distance measurement purposes. They are based on the principle of phase measurement or transit time measurement and comprise a transmitter with a transmitting optical system and a receiver with a receiving optical system. It is known to combine such devices with a theodolite. This known combination, then, comprises the transmitting and receiving optical system of a range finder together with a sighting telescope. For reasons of reduced complexity, reduced weight, and the simplification of the mutual adjustment of the various optical systems, it is advantageous to construct the transmitting and receiving optical system as a coaxial system with the sighting telescope integrated therein.

In a coaxial system of the above-described type, at least one beam splitting process is necessary in order to separate the transmitting beam path, receiving beam path, and the beam path of the sighting telescope. This may be accomplished in a known manner by the use of either a planar plate inclined relative to the optical axis and with a selectively reflecting dielectric coating system which on one side acts against air or by a photometer cube with a selectively reflecting, dielectrically mirrored photometric surface.

However, a coaxial system with an inclined planar plate or a photometer cube has disadvantages. As is known, in a non-parallel beam path, such as in the beam path of a sighting telescope, an inclined planar plate produces astigmatic errors which can only be compensated optically at high cost. In the case of the photometer cube on the other hand, technically unavoidable and spectrally-dependent variations of the reflection factor over the dielectrically mirrored photometric surface causes, for instance in the case of temperature variations, a change in the spectral characteristics of the radiation in the transmitting and receiving beam path. This leads to a deterioration of data transmission and evaluation and consequently to a reduction in the precision of measurement. In the case of an electro-optical range finder of a specific type, the permitted spectral variation of the reflection factor of the selectively reflecting beam splitting surface must typically be less than 1% for a distance measurement precision of ±5 mm. However, in the case of dielectric coating systems which act on glass on both sides, such as in a photometer cube or those systems designed for an angle of incidence of approximately 45°, this value cannot at present be attained.

BRIEF SUMMARY OF THE INVENTION

The problem of the invention is to improve a coaxial transmitting and receiving optical system of the type indicated hereinbefore so that it does not have the above-mantioned disadvantages.

According to the present invention, this problem is solved by the following arrangement, in which:
- the coaxial transmitting and receiving optical system and the sighting telescope have the same optical axis;
- a beam deflector which deflects into the optical axis the transmitting beam coming from an infra-red radiation-emitting source is located in the vicinity of the position at which there is an intermediate image formation of the transmitting beam path;
- a dielectric coating system arranged approximately perpendicular to the common optical axis and acting on one side against air is arranged in such a way that the transmitting beam from the beam deflector strikes the coating system in an almost perpendicular manner;
- the dielectric coating system is permeable to visible light.

The combination of the individual components which constitutes the invention provides several advantages which will be explained hereinafter. A double advantage is provided by the special arrangement of the beam deflector. On the one hand, unlike beam splitting, e.g. with a planar plate inclined relative to the optical axis or a photometer cube, it permits the use of technically realisable, selectively reflecting dielectric coating systems acting against air on one side with the very limited spectral fluctuation of the reflection factor which is necessary for electro-optical range finders, without astigmatic errors being produced in part of the optical system by the substrate for the dielectric coating system, such as by a plane-parallel glass plate. A further advantage is that the deflection from the optical axis of that transmitting or receiving beam which is not reflected on the beam deflector, which is perpendicular to the optical axis, and which is advantageously provided in accordance with the special development of the coaxial transmitting and receiving optical system can preferably be performed by known, non-selective reflectors such as by metallised surface-silvered mirrors with substantially no spectral fluctuation of the reflection factor. Furthermore, the coaxial transmitting and receiving optical system permits the optical axis of the integrated sighting telescope to be linear throughout.

BRIEF DESCRIPTION OF THE DRAWING

The drawing is a side, sectional view of an instrument in accordance with a preferred embodiment of the present invention.

DESCRIPTION OF THE PREFERRED EMBODIMENTS

A preferred embodiment of the present invention is the range finder instrument shown in the drawing. In the operation of the instrument, a light source 1 emits infra-red radiation. Such radiation sources are generally known. The transmitting beam from radiation source 1 is passed through the intermediate image formation lenses 2, 3 so that an intermediate image 4 of the light source 1 is formed. Beam deflector 5, which in the present embodiment is constructed as a prism, is arranged in the vicinity of the intermediate image 4. The deflecting prism 5 is positioned at the intersection point of the optical axes of the intermediate image formation lens 3 and the transmitting optical system 7. The transmitting beam is deflected by the deflecting prism 5 to a dielectric coating system 6 which is perpendicular to the optical axis of the transmitting optical system 7. This coating system 6, which on one side acts against air, comprises a certain number of thin dielectric coatings which are successively vapor-deposited onto a plane-parallel glass plate. The thickness of these coatings is in the range of fractions of the wave length of the infra-red transmitting beam used. It is possible to use for example, a dielectric coating system known as a heat protection filter and comprising alternately successively vapour-deposited high and low refractive index, thin, dielectric coatings of a dielectric such as of oxides of titanium and silicon in accordance with the prior art. In both bases, the spectral fluctuation of the reflection factor of the transmitting beam is very low, and in the present case is a maximum of 1%. The transmitting beam brought onto the dielectric coating system 6 by the deflecting prism 5 is consequently reflected onto the transmitting optical system 7 with a very small distortion. The intermediate image 4 of the source 1 is imaged in the focal plane of the transmitting optical system 7. The transmitting beam path 8 leaves the transmitting optical system 7 and is directed onto a remote reflector, not shown. The receiving beam path 9 from the reflector is collected by a dioptric or catadioptric annular lens 10 arranged coaxially with the transmitting optical system 7. In the present embodiment, the coaxial receiving optical system 10 is in the form of a lens system which has a central bore for the mounting of the transmitting optical system 7. The receiving optical system can obviously also be constructed as a mirror system. The essential point is the coaxial relationship between the receiving optical system 10 and the transmitting optical system 7. The receiving beam path 9 is projected by the annular receiving optical system 10 onto a metallized mirror 11 which is inclined relative to the optical axis of coaxial optical systems 7, 10. This metallized mirror has a peripheral zone which is constructed as a reflector surface and has a large central opening through which can pass in unimpeded manner the transmitting beam, the transmitting beam path 8, and the visual beam path for the sighting telescopes 16, 17, 18, 19. The receiving beam path 9 is projected onto the receiver 12 at the mirrored peripheral surface of surface-coated mirror 11. This receiver, which is of a generally known type, transfers the information contained in the receiving beam path 9 to the subsequently arranged electronic evaluation system.

An internal calibration system is arranged between the light source 1 and the receiver 12 for calibrating the range finder. For use of the calibration system, a movable mirror 13 is pivoted into the position indicated by dotted lines. As a result, the transmitting beam from light source 1 passes via the intermediate image formation optical system, mirror 13, prism 14, and intermediate image formation lens 15, to receiver 12 for subsequent electronic evaluation.

A sighting telescope 16, 17, 18, 19 has been integrated into the hitherto described coaxial transmitting and receiving optical system in such a way that the optical axis of the coaxial system coincides with that of the sighting telescope. This integrated sighting telescope comprises in a known manner the lens 7 common to the transmitting and receiving optical systems, and in the following sequence: the focussing lens 16, the erecting prism 17, the reticule 18, and the eye piece 19. The beam deflector 5, which deflects the transmitting beam onto the dielectric coating system 6, is positioned in such a way that it is located in the common optical axis of the range finder and the sighting telescope. This leads to a partial shading of the entrance pupil of the sighting telescope. Due to the favorable position of the beam deflector 5 in the transmitting beam and transmitting beam path 8, and due to the corresponding spatial volume of the beam deflector, including its mounting, the function of the instrument is not impaired. Due to the intermediate imaging of the transmitting beam path, the deflecting prism 5 can be made with small spatial dimensions, whereby it completely fulfills its desired function and causes substantially no shading of the entrance pupil of the sighting telescope.

The electro-optical range finder with integrated sighting telescope are combined into the common unit shown in the drawing. This unit can be pivoted or tilted about a shaft 20, which is mounted in a support of a combined angle/distance measuring device.

We claim:

1. A coaxial transmitting and receiving optical system of an electro-optical range finder of the type for transmitting and receiving a modulated beam of light for the distance determination to a remote reflector and having an integrated sighting telescope for sighting said reflector or some other target, wherein the improvement comprises that:

said coaxial transmitting and receiving optical system and said sighting telescope have the same optical axis;

a beam deflector which deflects into the optical axis the transmitting beam coming from an infra-red radiation-emitting source is arranged in the vicinity of the position at which there is an intermediate image formation of the transmitting beam source;

a dielectric coating system which is permeable to visible light is arranged on a substrate approximately perpendicular to the common optical axis and is on one side bounded by air, said substrate being arranged in such a way that the transmitting beam from said beam deflector strikes said coating system in an almost perpendicular manner.

2. A coaxial transmitting and receiving optical system according to claim 1, wherein intermediate image formation lenses which produce an intermediate image of the light source in the focal plane of a transmitting lens are provided between said light source and said beam deflector.

3. A coaxial transmitting and receiving optical system according to claim 1 wherein said receiving optical system is constructed as an annular lens system comprising an annular reflector.

4. A coaxial transmitting and receiving optical system according to claim 1, wherein the receiving beam from said remote reflector is received by means of said receiving optical system, which comprises a dioptric annular lens or a catadioptric annular lens system for projecting the received beam via a metallized mirror which is inclined relative to said optical axis, and said received beam is then transferred by said mirror to a receiver.

5. A coaxial transmitting and receiving optical system according to claim 4, wherein said mirror is in the form of a ring, so that the transmitting beam path reflected by said coating system passes unimpeded through the opening of said annular mirror onto a lens of said transmitting optical system and the beam path of said sighting telescope passes through this opening without being partially blocked by said annular mirror.

* * * * *